United States Patent [19]
Loaiza et al.

[11] Patent Number: 6,012,060
[45] Date of Patent: *Jan. 4, 2000

[54] SHARING, UPDATING DATA BLOCKS AMONG MULTIPLE NODES IN A DISTRIBUTED SYSTEM

[75] Inventors: Juan R. Loaiza, San Carlos; Neil Macnaughton, Los Gatos; Roger J. Bamford, Woodside; William H. Bridge, Alameda; Boris Klots, Palo Alto, all of Calif.

[73] Assignee: Oracle Corporation, Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,651

[22] Filed: May 30, 1997

[51] Int. Cl.[7] .................................................... G06F 17/30
[52] U.S. Cl. ................................ 707/10; 707/8; 707/203; 707/204; 395/200.33; 709/231; 709/232
[58] Field of Search .................................. 707/6, 7, 8, 9, 707/10, 2, 206, 200–204; 395/200.31, 200.33, 200.42, 200.48, 200.49, 200.53; 709/223–225, 227, 230–232, 236–237, 248–249

[56] References Cited

U.S. PATENT DOCUMENTS

| | | | |
|---|---|---|---|
| 4,620,276 | 10/1986 | Daniell et al. | 395/200.31 |
| 4,714,992 | 12/1987 | Gladney et al. | 707/206 |
| 5,269,020 | 12/1993 | Kakimoto | 707/8 |
| 5,452,445 | 9/1995 | Hallmark et al. | 707/2 |
| 5,557,792 | 9/1996 | Josten et al. | 707/8 |

*Primary Examiner*—Jack M. Choules
*Assistant Examiner*—Srirama Channavajjala
*Attorney, Agent, or Firm*—McDermott, Will & Emery

[57] ABSTRACT

A method for preventing multiple pings. An embodiment of the invention detects requests of data blocks entailing pings likely to cause additional pings. The servicing of requests involving a pings likely to cause additional pings is deferred until a service enabling conditions occurs. Another embodiment of the invention detects situations where by further updating a data block before pinging the data block use of resources on the remote node requesting the data block are reduced. The servicing of the request for the data block is deferred until a service enabling conditions occurs.

22 Claims, 4 Drawing Sheets

TRANSACTION TABLE 120

| SLOT | SEQUENCE # | STATUS | COMMIT TIME |
|---|---|---|---|
| 0 | 7 | COMMITTED | |
| 1 | 9 | ACTIVE | |
| 2 | 5 | COMMITTED | |
| 3 | 8 | ACTIVE | |
| 4 | 6 | ACTIVE | |

DATA BLOCK 108

| TRANSACTION LIST 128 | | | | |
|---|---|---|---|---|
| INDEX | TID | STATUS FLAG | COMMIT TIME | ... |
| • | • | • | • | • |
| • | • | • | • | • |
| • | • | • | • | • |

DATA ITEM 126

SHARING, UPDATING DATA BLOCKS AMONG MULTIPLE NODES IN A DISTRIBUTED SYSTEM

FIELD OF THE INVENTION

The present invention relates to data processing systems, and more specifically, to sharing data between multiple nodes in a distributed system.

BACKGROUND OF THE INVENTION

In typical database systems, users of the database system update information by submitting command statements to the database system. To be correctly processed, one or more command statements are organized into a logical unit of work referred to as a transaction. When multiple users share a database system, it is impractical to allow only one transaction to execute at a time. However, when many transactions are allowed to execute at the same time, it is possible for the transactions to interact in undesirable ways.

TRANSACTIONS

To ensure predictable and reproducible results, techniques have been developed which protect concurrently executing transactions from interacting with one another in uncontrolled ways. Some techniques involve maintaining data structures within a data block which describe transactions affecting the block. One example of data structure is a transaction list.

Typically each entry in the transaction list contains information about the transaction that corresponds to the entry. In exemplary transaction list 128 (shown in FIG. 1C), each entry includes an index number for the entry, a transaction identifier ("TID") that uniquely identifies the transaction associated with the entry, a status flag that indicates whether the transaction is active or committed, and the commit time of the transaction if the transaction is marked as committed. The entries may also include other information, such as pointers to records that indicate how to undo the changes made to the data block by the transaction that corresponds to the entry.

Typically, an update operation involves updating both a data item in a data block and the transaction list of the data block. FIG. 1A is used to illustrate the steps typically performed during an update operation. Referring to FIG. 1A, a transaction 114 specifies an update to a data item 126 that is stored in a data block 108 within a database 112. Before the transaction 114 can perform the update, the current version of the data block 108 must be loaded into a buffer cache 110 in dynamic memory 304 and locked.

Transaction 114 requests an exclusive lock of data block 108 from lock manager 140. If data block 108 is not already in buffer cache 110, then lock manager 140 loads block 108 into buffer cache 110. Lock manager 140 grants a lock on data block 108 to transaction 114. When transaction 114 commits, it transmits a message to lock manager 140 to relinquish the transaction's lock on the data block. If a transaction requests a lock when another transaction has been previously granted an exclusive lock which has not been relinquished, the requesting transaction is placed on a wait list for that block. When lock manager 140 relinquishes a transaction's lock, lock manager 140 then grants a lock to the transaction with the next request on the wait list.

When the lock request for transaction 114 is granted, transaction 114 can then update both the data item 126 in the data block 108 and the transaction list 128 in the data block 108. These updates create an updated version of the data block (data block 108') in the buffer cache 110.

The update to the transaction list 128 may include, for example, adding an entry to the transaction list 128 to indicate that transaction 114 has updated data block 108. At the time transaction 114 makes the update to data block 108, transaction 114 will be active. Consequently, the entry added to transaction list 128 will not indicate a commit time for transaction 114.

In order for the transaction lists in all of the data blocks updated by transaction 114 to actually reflect the commit time of transaction 114, all of the data blocks that were updated by transaction 114 will have to be updated after transaction 114 commits to reflect the correct status and commit time of transaction 114. The operation of updating the transaction list of a data block with the commit time of a transaction that updated the data block is referred to as block cleanout. If a transaction updated thousands of data blocks, block cleanout must be performed on those thousands of data blocks after the transaction commits to indicate the commit time of the transaction.

The identity of a data block requiring block cleanout is stored as an entry in a list. Block cleanout list 149 is an example of such a list. Block cleanout list 149 has entries for data blocks requiring cleanout for transaction 114. Each transaction has its own block cleanout list.

Because it is so expensive to update every data block that a transaction has changed with the commit time of the transaction, some database systems do not perform block cleanout when a transaction commits. Rather, the commit time of the transaction is simply stored elsewhere, and block cleanout is postponed until a block cleanout process, such as block cleanout process 148, performs block cleanout.

For example, some database systems simply store the commit time of a transaction in an entry of a transaction table. An exemplary transaction table 120 is illustrated in FIG. 1B. Each entry in transaction table 120 corresponds to a transaction. Each entry includes a slot number and sequence number that are used to uniquely identify the transaction represented by the entry. In addition, each entry also includes a status flag to indicate the status of the corresponding transaction, and a field for the commit time of the corresponding transaction.

There is only one transaction table entry for any given transaction. Therefore, updating the transaction table entry of a transaction with the commit time of the transaction when the transaction commits involves significantly less overhead than updating the transaction lists of every data block that includes a data item that was updated by the transaction.

Because the transaction lists of the data blocks that were updated by a transaction are not updated when the transaction commits, the transaction list in any given data block does not necessarily reflect the correct status information about the transactions that updated the data block. In such systems, the responsibility for determining the actual status of the transactions listed in the transaction list 128 typically falls on the transaction that needs accurate information about the previous transactions, such as a transaction that performs a subsequent update to a data item in the data block.

To subsequent transactions processing data blocks needing block cleanout, a previous transaction that updated the data block can appear to remain active. The reason for this active appearance is that the transaction status and commit time recorded in the transaction list of the data block have not been updated. To verify that a transaction is still active, the subsequent transaction will inspect the transaction table that contains the entry for the transaction in question. If the transaction has in fact committed, the subsequent transaction updates the data block to reflect the correct status and commit time for the transaction.

Typically, an updated data block is not immediately written from buffer cache back to disk. In fact, updated data blocks may remain in the buffer cache even after the transaction that made the update has committed. When a transaction commits, all of the locks held by a transaction are released before block cleanout is performed. The data block may then be processed by a subsequent transaction. If the subsequent transaction resides on another node, the data block must be shipped to the other node.

PINGS

Circumstances in which information stored in the buffer cache of one node is required by a transaction in another node are referred to as pings. Pings are very expensive, and often involve writing the information from one cache to disk, then from the disk to another cache, and numerous lock-related operations.

For example, when transaction 130 on node B requires data block 108 in buffer cache 110 on node A, transaction 130 transmits a lock request of data block 108 to lock manager 180 on node B. In response, lock manager 180 on node B transmits a request for data block 108 to lock manager 140 on node A. When a request for a data block from another node is received, subsequent lock requests originating from transactions on node A are not added to wait list 150. Requests already on the wait list 150 are honored before the request for data block 108 from lock manager 180 on node B.

When the last transaction that was on the wait list relinquishes its lock, data block 108 is shipped to node B. In response to receiving subsequent requests from transactions on node A, lock manager 140 on node A requests data block 108 from lock manager 180 on node B. When lock manager 180 on node B releases data block 108 to lock manager 140 on node A, the subsequent requests on node A are added to the wait list and granted locks in the manner already described.

While these subsequent requests on node A are waiting for a lock of data block 108, the subsequent requests incur a major delay caused by waiting for the completion of the servicing of at least two pings. The first ping is the ping which causes the data block to be shipped from node A to node B. The second ping is the ping which causes the data block to be shipped from node B to node A in response to the immediate request from lock manager 140 on node A. A situation where shipping a block from a first node to a second node is followed by an immediate request for the block to be shipped back to the first node is referred to as a double ping.

Based on the foregoing, it is clearly desirable to reduce the number of double pings that occur in a computer system.

SUMMARY OF THE INVENTION

A method for reducing the number of pings that occur in a multiple node system is disclosed. According to an aspect of the invention, requests that constitute pings and that are likely to cause additional pings are detected, such as a request that constitutes a ping of a data block upon which block cleanout has not been performed. The servicing of a request constituting a ping that is likely to cause one or more additional pings is deferred until a service enabling conditions occurs. One example of a service enabling condition includes the performance of operations which will likely avoid the need for the additional ping, such as performing block cleanout. Another example of a service enabling condition is the lapse of a period of time.

According to another aspect of the invention, situations are detected where, by further updating a data block before shipping the data block, use of resources on the remote node requesting the data block can be reduced. In these situations, the servicing of the request for the data block is deferred until a service enabling conditions occurs. An example of a service enabling condition is the performance of the further updating that will reduce use of resources by the remote node.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a block diagram illustrating a transaction table;

FIG. 1C is a block diagram that illustrates data block 108 of FIG. 1A in greater detail;

DETAILED DESCRIPTION OF THE PREFERRED EMBODIMENT

Often, the requests that cause and are delayed by the double pings (the requests for the block to be returned) involve updates that could have been quickly performed if the data block was not shipped to the remote node before the updates were performed. For example, the requests that are deferred by a double ping may be requests initiated to perform block cleanout. Shipping data blocks on which block cleanout has been deferred to a remote node is especially inefficient. In addition to the double ping for the data block, an additional ping is incurred to transfer the transaction table from the first node to the second node for inspection by the second node.

A method and apparatus for reducing the number of pings that occur in a multiple node system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 3:
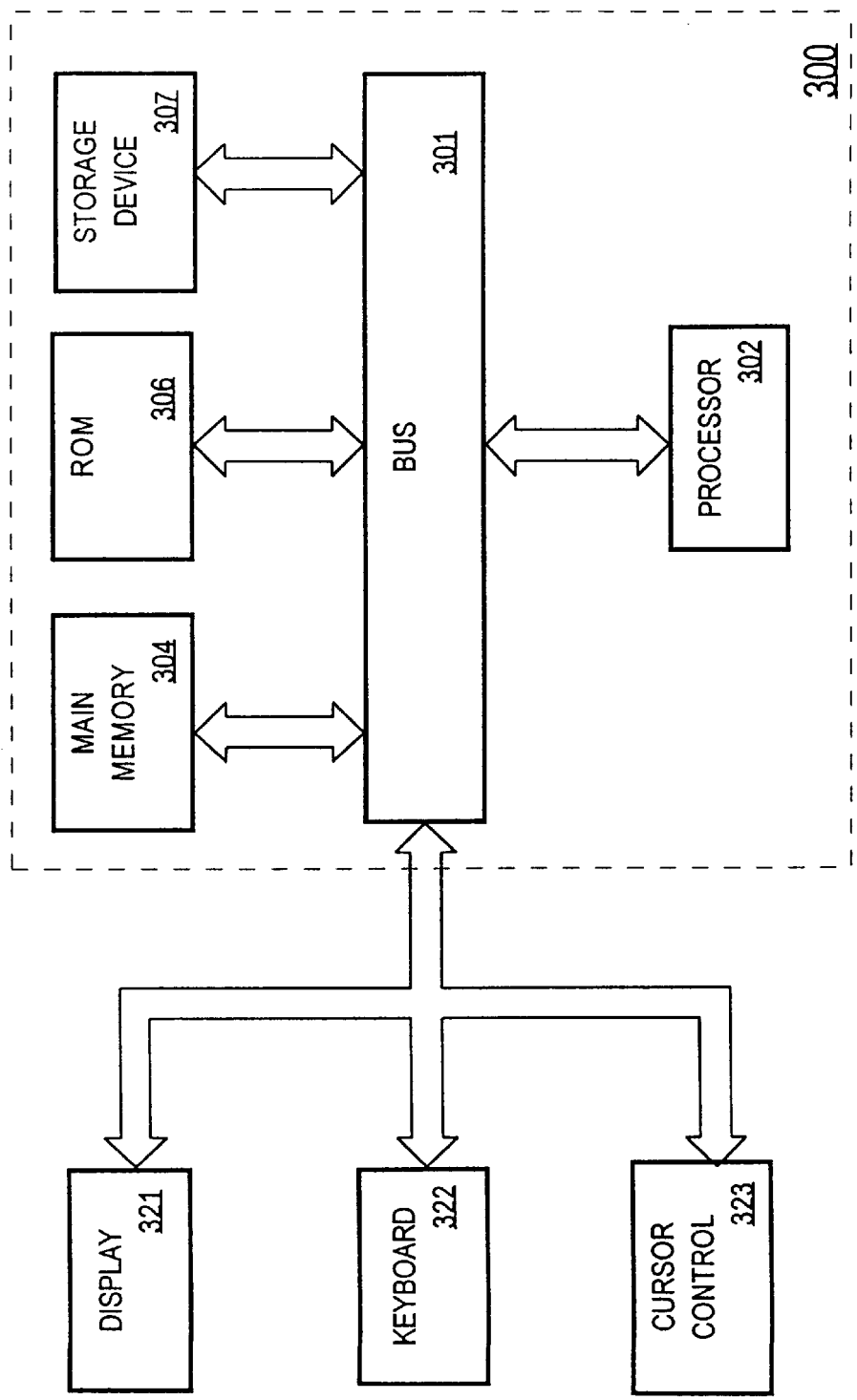
FIG. 3 is a block diagram illustrating a computer system on which an embodiment of the present invention may be implemented.

FIG. 3 illustrates a block diagram of a computer system 300 upon which an embodiment of the present invention may be implemented. Computer system 300 includes a bus 301 or other communication mechanism for communicating information, and a processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also includes a read only memory (ROM) and/or other static storage device 306 coupled to bus 301 for storing static information and instructions for processor 302. A data storage device 307, such as a magnetic disk or optical disk, is coupled to bus 301 for storing information and instructions.

Computer system 300 may also be coupled via bus 301 to a display device 321, such as a cathode ray tube (CRT), for displaying information to a computer user. An alphanumeric input device 322, including alphanumeric and other keys, is typically coupled to bus 301 for communicating information and command selections to processor 302. Another type of user input device is cursor control 323, such as a mouse, a trackball, or cursor direction keys for communicating direction information and command selections to processor 302 and for controlling cursor movement on display 321. This input device typically has two degrees of freedom in two axes, a first axis (e.g., x) and a second axis (e.g., y), which allows the device to specify positions in a plane.

The present invention is related to the use of computer system 300 to reducing the number of pings that occur in a multiple node system. According to one embodiment, reducing the number of pings that occur in a multiple node system is performed by computer system 300 in response to processor 302 executing sequences of instructions contained in memory 304. Such instructions may be read into memory 304 from another computer-readable medium, such as a data storage device. Execution of the sequences of instructions contained in memory 304 causes processor 302 to perform the process steps that will be described hereafter. In alternative embodiments, hard-wired circuitry may be used in place of or in combination with software instructions to implement the present invention. Thus, the present invention is not limited to any specific combination of hardware circuitry and software.

Functional Overview

In one embodiment of the invention, servicing a request that causes a ping is deferred if deferring the shipping of a data block is likely to avoid one or more other pings. Specifically, shipping a data block from a first node to a second node is deferred upon detecting a situation in which it is likely that a transaction at the first node will update the data block but has not yet requested the data block. The update required by the transaction at the first node is performed before shipping the requested data block to the second node, thereby avoiding the need to immediately ship the data block back to the first node from the second node.

An example of a situation in which it is likely that a transaction at the first node will soon require an update of a data block is a situation in which a data block is involved in a block split operation. A block split operation is an operation in which the contents of one data block are distributed between two or more data blocks. A block split operation is often required to adjust the balance of a database index. During a block split operation, one data block is updated twice. If that one block is shipped from the first node to a second node after the first update but before the second, then that block must be shipped back to the first node from the second node before the second update can proceed. To avoid delay to the second update, the shipping of the block to the second node can be deferred to allow completion of the second update on the first node.

Deferring the shipment of a data block from the first node to the second when detecting that the data block is the midst of a block split operation on the first node highlights the advantage that results from deferring the shipment of a data block from the first node to the second node when detecting a situation in which it likely that a transaction on the first node will update the block but has not yet requested the block. That advantage is that the transaction on the first node that will in the future likely update the data block proceeds more quickly because the future update is not delayed by waiting for the shipment of the data block back to the first node from the second node. This aspect of the invention is especially beneficial when critical operations required by transactions, such as a block split operation, are performed more quickly.

According to one embodiment of the invention, a decision to defer shipping a data block from a first node to a second node in response to a request from the second node for the data block is based on detecting that block cleanout has not yet been performed for a transaction executing on the first node on the data block requested by a second node. Deferring shipment of that data block from the first node to the second node will likely prevent the transfer of other data that is in the cache of the first node to the second node. Specifically, the transaction table that contains the entry for the transaction for which block cleanout has not been performed on the data block will likely be prevented from being shipped from the first node to the second node. Typically, the transaction table that includes the entry for the transaction for which block cleanout has not been performed on a data block will reside in the buffer cache of the node in which the data block resides. Shipping to a second node a data block pending cleanout on a first node can likely cause the shipment of the transaction table to the second node. However, if the shipment of the data block from the first node to the second node were deferred, block cleanout could be performed on the first node before the data block is shipped to the second node, thereby avoiding shipping the transaction table from the first node to the second node.

Deferring the shipment of a data block from the first node to the second node in response to a request from the second node for the data block when block cleanout has not yet been performed on that data block for a transaction executing on the first node likely conserves resources on the second node. For example, assume that a data block in the cache of a first node is requested by a second node while the data block is pending block cleanout on the first node. To the transaction on a second node accessing the data block from a first node when the data block is pending block cleanout on the first node, the transaction on the first node appears to still be active. To verify that the transaction on the first node is still active, the transaction on the second node requires the performing of additional operations. These additional operations include requesting and receiving a transaction table from the first node, scanning the transaction table to determine the status of the transaction on the first node, and updating the data block to reflect the correct status and commit time. Performing these additional operations on the second node expends additional resources on the second node.

Updating the data block by performing block cleanout on the first node before shipping the data block from the first node to the second node avoids performing these additional operations on the second node and the additional expenditure of resources on the second node required to perform the additional operations. Consequently, by updating the data block in the cache of the first node before shipping the data block to the second node, resources on the second node are conserved.

Another advantage offered by deferring the servicing of request that causes a ping when deferring the shipping of the data block avoids one or more other pings is that the overall number of pings is reduced. Pings are very expensive in terms of computer resources. Often, pings involve operations such as writing the information from one cache to disk, then from the disk to another cache, and numerous lock-related operations, including lock related operations by the operating system. Reducing the number of pings reduces computer resources used by the operations caused by pings. Consequently, overall system performance is improved.

A further advantage offered by reducing the number of pings is that reducing the number times a data block is shipped decreases the amount of time a data block is in transit from one node to another. When data blocks are in transit from one node to another, data base operations on them cannot be performed. By reducing the amount of time a data block is in transit, the amount of time a data block is available for data base operations is increased. Consequently, overall system performance is improved.

Steps of Preventing Additional Pings

Figure 2:
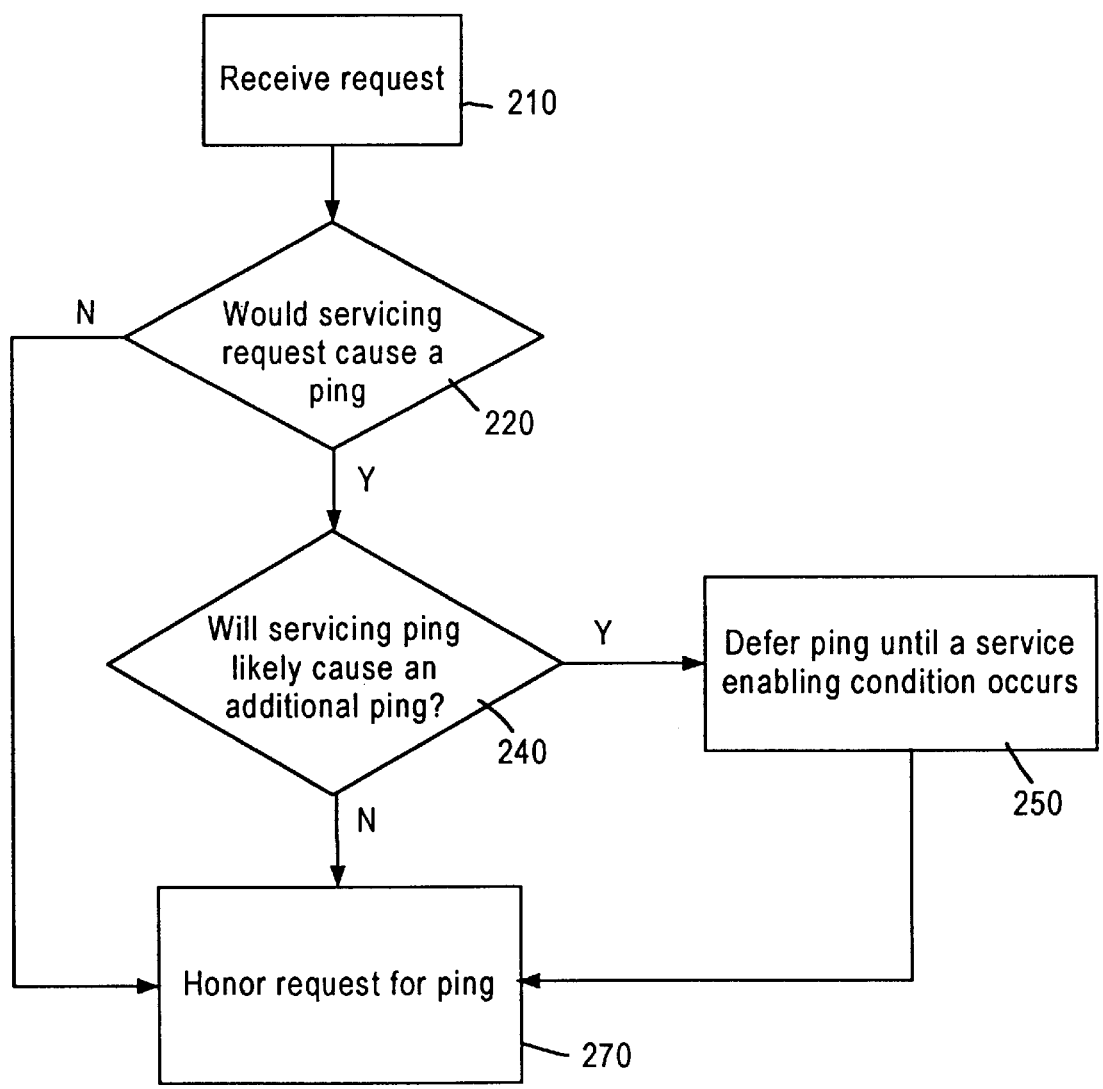
FIG. 2 is a flowchart illustrating the steps for reducing the number of pings according to an embodiment of the invention.

FIG. 2 is a flow chart that illustrates the steps performed by one embodiment of the invention. In step 210, a request is received from a second node for a data block that currently resides in the cache of a first node. Control then passes to step 220. In step 220, a determination is made of whether servicing the request would cause a ping. If servicing the request would not cause a ping, then control passes to step 270, where the request for the data block is honored.

Detecting situations Causing Additional Pings

In step 240, it is determined whether servicing a request that causes a ping will likely cause an additional ping. As mentioned above, such situations may include situations in which the data block is involved in an uncompleted block split operation on the first node, or is pending cleanout on the first node.

Defering Servicing of Pings

If at step 220 the determination made is that a situation exits where the deferral of servicing a request causing a ping avoids another ping, control passes to step 250. In step 250, the servicing of the request is deferred.

The servicing of the request is deferred until one or more conditions in a set of "service enabling" conditions occurs. In one embodiment of the invention, the set of service enabling conditions includes the lapse of a period time beginning when the deferral begins. Limiting the deferral to a period of time avoids deadlocks caused by a transaction executing on the second node waiting for a prolonged period of time for the data block to be shipped from the first node. The set of servicing enabling conditions further includes the completion of a set of operations that avoid an additional ping. For example, a data block may be shipped w hen a block split operation on the block is completed. When one or more conditions in a set of enabling conditions occurs, control passes to step 270.

All paths through the steps of FIG. 2 lead to step 270. In step 270, the request for the data block is serviced.

Exemplary Illustration of the Steps

The steps outlined above are applicable to any situation in any computer system where deferring the servicing of request for a data block causing a ping of that data block is likely to avoid additional pings. The following illustration is just an example of one embodiment of the invention. The embodiment in the following illustration avoids additional pings by deferring the servicing of a request from a second node for a data block that currently resides in the cache of the first node when that data block is pending block cleanout for a transaction that was executed at the first node.

Alternate embodiments could, for example, defer the servicing of a request from a second node for data block that currently resides in the cache of a first node when that data block has been recently modified on the first node. In database systems, the data blocks most recently modified are the data blocks most likely to be modified in the immediate future. Thus, when these data blocks are shipped from a node to another node, these data blocks are the most likely to cause additional pings because these data blocks are the most likely to be requested from transactions on the node from which the block was shipped.

Exemplary Database System

Figure 1A:
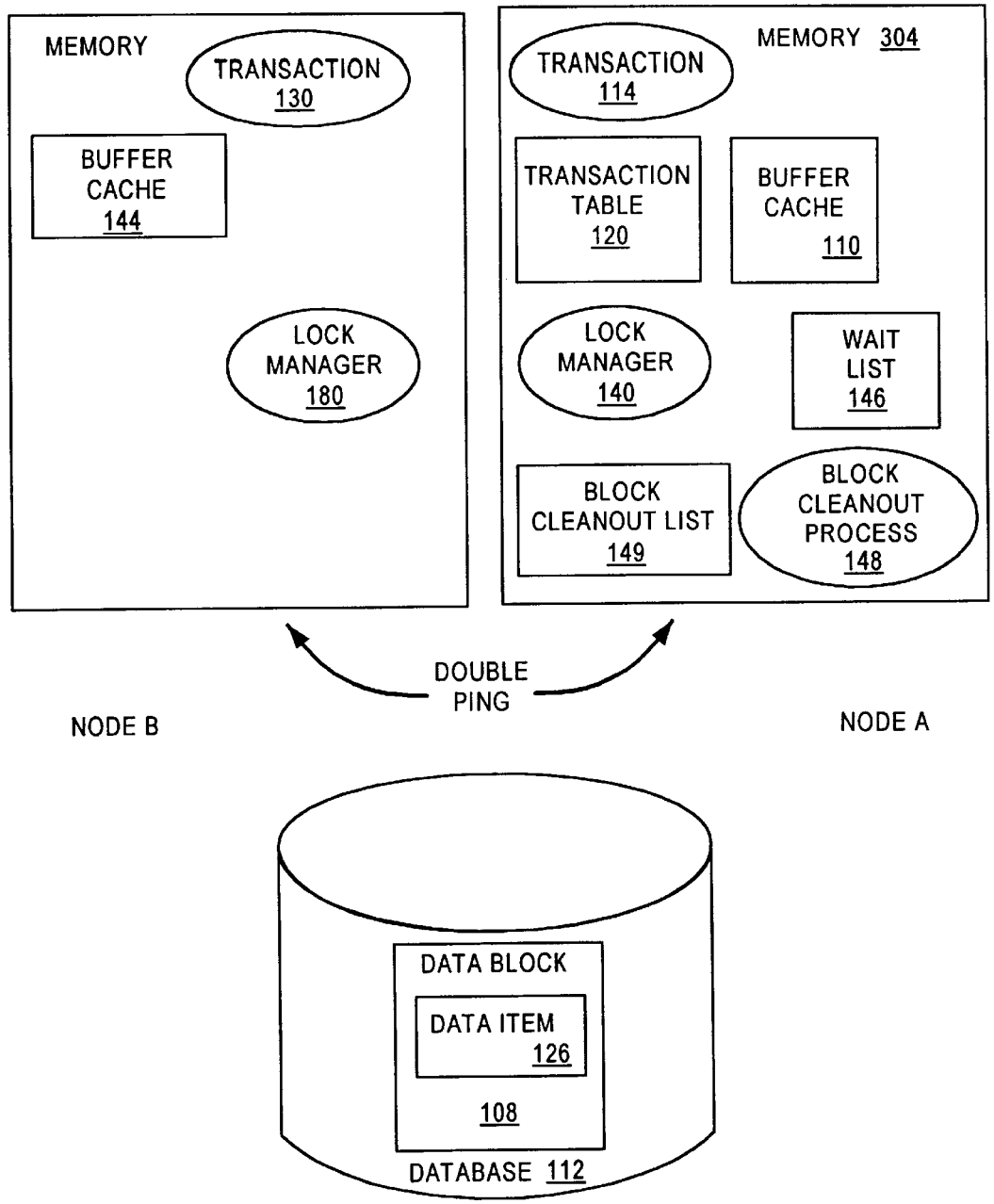
FIG. 1A is a block diagram showing an exemplary database system used to provide an illustration of an embodiment of the invention.

The database system depicted in FIG. 1A is used in an example illustrating the operation of the steps in FIG. 2. Referring to FIG. 1A, transaction 114 is on wait list 146 for data block 108. Data block 108 is currently locked by another transaction. Meanwhile, transaction 130 on node B requests from lock manager 180 a lock on data block 108.

In response, lock manager 180 on node B transmits a request for data block 108 to lock manager 140 on node A. In step 210, lock manager 140 receives a request for data block 108. Control then passes to step 220.

In step 220, it is determined whether servicing the request from lock manager 180 will cause a ping. Lock manager 140 detects that the request from lock manager 180 is a request from a remote node, node B, and will therefore cause a ping. Control then passes to step 240.

Detecting Block Cleanout

In step 240, it is determined whether servicing the request will cause an additional ping. In this illustration, it is determined whether the data block for which the request was made is a data block pending cleanout on node A. Servicing a request causing the ping of a data block pending cleanout on node A will likely cause an additional ping of the transaction table.

To determine whether data block 108 is a data block pending cleanout on node A, the transaction list 128 of data block 108 is scanned. Based on transaction list 128, it appears that data block 108 has been updated by an uncommitted transaction, transaction 114. Lock manager 140 then scans block cleanout list 149, the block cleanout list for transaction 114. Lock manager 140 finds data block 108 as an entry in block cleanout list 149 and thus determines that data block 108 is a block pending cleanout on node A. Thus, servicing the request by transaction 130 on node B for data block 108 by shipping data block 108 to node B will likely cause an additional ping of the transaction table. Control then passes to step 250.

Deferring Until Block Cleanout Performed

In step 250, lock manager 140 defers servicing the request by transaction 130 on node B for data block 108 until a service enabling condition occurs. The service enabling conditions include either the lapse of a period of time or the completion of block cleanout on the data block. Soon after deferral begins, block cleanout process 148 requests a lock from lock manager 140 for data block 108. Because no request is on the waiting list, lock manager 140 immediately grants the lock. Block cleanout process 148 performs block cleanout on data block 108. When block cleanout process 148 finishes block cleanout, it transmits a message to relinquish the lock of data block 108 to lock manager 140.

Lock manager 140 receives the request to relinquish the lock of data block 108 by block cleanout process 148 and determines that block cleanout on node A has been performed on data block 108. Note that lock manager 140 could find additional uncommitted transactions listed in the transaction list of data block 108. Lock manager 140 then could scan the block cleanout list corresponding to the uncommitted transactions to determine whether data block 108 is still a block pending cleanout. If the period of time for deferral has lapsed, lock manager 140's deferral of shipping data block 108 ceases even if data block 108 is still pending cleanout on node A. After deferral of the ping ceases, control passes to step 270.

In step 270, the request for data block 108 by lock manager 180 on node B is honored. The data block 108 is shipped to node B.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for sharing data among nodes in a distributed system, the method comprising the steps of:

receiving a request from a first node for a transfer of a requested data block that currently resides in a second node;

detecting that a servicing of said request from said first node will likely cause one or more additional transfers of data between said first node and said second node in addition to the transfer of the requested data block that will be performed in response to servicing said request;

in response to detecting that the servicing of said request from said first node will likely cause one or more additional transfers of data between said first node and said second node in addition to the transfer of the requested data block that will be performed in response to servicing said request, deferring said servicing of said request from said first node until a first subset of service enabling conditions occurs; and servicing said request by transferring a copy of the requested data block from said second node to said first node.

2. The method of claim 1, wherein:

the step of detecting that the servicing of said request from said first node will likely cause one or more additional transfers of data between said first node and said second node includes detecting a situation in which it is likely that said second node will perform operations to said data block that have not yet been requested; and said first subset of service enabling conditions includes:

receiving a request for said operations to said data block to be performed by said second node, and performing said operations on said second node.

3. The method of claim 1, wherein:

the step of detecting that the servicing of said request from said first node will likely cause one or more additional transfers of data between said first node and said second node includes detecting that said second node will likely perform a block cleanout operation that has not yet been requested; and said first subset of service enabling conditions includes performing said block cleanout operation that has not yet been requested.

4. The method of claim 1, wherein the said first subset of service enabling conditions includes a lapse of a period of time.

5. The method of claim 1, wherein:

the step of detecting that the servicing of said request from said first node will likely cause one or more additional transfers of data between said first node and said second node includes detecting a situation in which it is likely that said second node will perform block split operations involving said data block; and said first subset of service enabling conditions includes performing said block split operations.

6. A method for sharing data among nodes in a distributed system, the method comprising the steps of:

receiving a request from a first node for a transfer of a requested data block that currently resides in a second node;

detecting situations wherein said second node can likely reduce use of resources by said first node by performing, prior to transmitting said requested data block to said first node in response to said request, further updates to the requested data block;

in response to detecting situations wherein said second node can likely reduce use of resources by said first node by performing, prior to transmitting said requested data block to said first node in response to said request, further updates to the requested data block, deferring a servicing of said request from the first node until a first subset of service enabling conditions occurs; and servicing said request by transferring said requested data block from said second node to said first node.

7. The method of claim 6, wherein said first subset of service enabling conditions includes performing further updates to the requested data block.

8. The method of claim 6, wherein said first subset of service enabling conditions includes a lapse of a period of time.

9. The method of claim 6, wherein the step of detecting situations wherein said second node can likely reduce use of resources by said first node detecting situations wherein said second node can likely reduce use of resources by said first node by performing block cleanout on the requested data block.

10. The method of claim 9, wherein said first subset of service enabling conditions includes performing block cleanout on the requested data block.

11. The method of claim 6, wherein:

the step of detecting situations wherein said second node can likely reduce use of resources by said first node includes detecting situations wherein said second node can likely reduce use of resources by said first node by completing block split operations involving the requested data block; and said first subset of service enabling conditions includes performing said block split operations.

12. A computer readable medium having stored thereon a plurality of sequences of instructions for sharing data among nodes in a distributed system, said plurality of sequences of instructions which, when executed by a processor, cause said processor to perform the steps of:

receiving a request from a first node for a transfer of a requested data block that currently resides in a second node;

detecting that a servicing of said request from said first node will likely cause one or more additional transfers of data between said first node and said second node in addition to the transfer of the requested data block that will be performed in response to servicing said request;

in response to detecting that the servicing of said request from said first node will likely cause one or more additional transfers of data between said first node and said second node in addition to the transfer of the requested data block that will be performed in response to servicing said request, deferring said servicing of said request from said first node until a first subset of service enabling conditions occurs; and servicing said request by transferring a copy of the requested data block from said second node to said first node.

13. The computer readable medium of claim 12, wherein:

the step of detecting that the servicing of said request from said first node will likely cause one or more additional transfers of data between said first node and said second node includes detecting a situation in which it is likely that said second node will perform operations to said data block that have not yet been requested; and said first subset of service enabling conditions includes:
receiving a request for said operations to said data block to be performed by said second node, and performing said operations on said second node.

14. The computer readable medium of claim 12, wherein:

the step of detecting that the servicing of said request from said first node will likely cause one or more additional transfers of data between said first node and said second node includes detecting that said second node will likely perform a block cleanout operation that has not yet been requested; and said first subset of service enabling conditions includes performing said block cleanout operation that has not yet been requested.

15. The computer readable medium of claim 12, wherein the said first subset of service enabling conditions includes a lapse of a period of time.

16. The computer readable medium of claim 12, wherein:

the step of detecting that the servicing of said request from said first node will likely cause one or more additional transfers of data between said first node and said second node includes detecting a situation in which it is likely that said second node will perform block split operations involving said data block; and said first subset of service enabling conditions includes performing said block split operations.

17. A computer readable medium having stored thereon a plurality of sequences of instructions for sharing data among nodes in a distributed system, said plurality of sequences of instructions which, when executed by a processor, cause said processor to perform the steps of:

receiving a request from a first node for a transfer of a requested data block that currently resides in a second node;

detecting situations wherein said second node can likely reduce use of resources by said first node by performing, prior to transmitting said requested data block to said first node in response to said request, further updates to the requested data block;

in response to detecting situations wherein said second node can likely reduce use of resources by said first node by performing, prior to transmitting said requested data block to said first node in response to said request, further updates to the requested data block, deferring a servicing of said request from the first node until a first subset of service enabling conditions occurs; and servicing said request by transferring said requested data block from said second node to said first node.

18. The computer readable medium of claim 17, wherein said first subset of service enabling conditions includes said further updates to the requested data block.

19. The computer readable medium of claim 17, wherein said first subset of service enabling conditions includes a lapse of a period of time.

20. The computer readable medium of claim 17, wherein the step of detecting situations wherein said second node can likely reduce use of resources by said first node includes detecting situations wherein said second node can likely reduce use of resources by said first node by performing block cleanout on the requested data block.

21. The computer readable medium of claim 20, wherein said first subset of service enabling conditions includes performing block cleanout on the requested data block.

22. The computer readable medium of claim 17, wherein:

the step of detecting situations wherein said second node can likely reduce use of resources by said first node includes detecting situations wherein said second node can likely reduce use of resources by said first node by completing block split operations involving the requested data block; and said first subset of service enabling conditions includes performing said block split operations.

* * * * *